United States Patent
Ninoyu et al.

(10) Patent No.: US 10,870,417 B2
(45) Date of Patent: Dec. 22, 2020

(54) VEHICLE BRAKING DEVICE

(71) Applicants: ADVICS CO., LTD., Kariya (JP);
TOYOTA JIDOSHA KABUSHIKI KAISHA, Toyota (JP)

(72) Inventors: Masaki Ninoyu, Gamagori (JP);
Yusuke Kamiya, Toyota (JP)

(73) Assignees: ADVICS CO., LTD., Kariya (JP);
TOYOTA JIDOSHA KABUSHIKI KAISHA, Toyota (JP)

( * ) Notice: Subject to any disclaimer, the term of this patent is extended or adjusted under 35 U.S.C. 154(b) by 20 days.

(21) Appl. No.: 16/299,237

(22) Filed: Mar. 12, 2019

(65) Prior Publication Data

US 2019/0299950 A1 Oct. 3, 2019

(30) Foreign Application Priority Data

Mar. 30, 2018 (JP) ................................. 2018-069088

(51) Int. Cl.
| | |
|---|---|
| *B60T 13/68* | (2006.01) |
| *B60T 8/36* | (2006.01) |
| *F15B 9/02* | (2006.01) |
| *B60T 8/176* | (2006.01) |
| *B60T 13/14* | (2006.01) |
| *B60T 7/04* | (2006.01) |

(52) U.S. Cl.
CPC ............ *B60T 8/3615* (2013.01); *B60T 7/042* (2013.01); *B60T 8/176* (2013.01); *B60T 13/145* (2013.01); *B60T 13/686* (2013.01); *F15B 9/02* (2013.01)

(58) Field of Classification Search
CPC .... B60T 8/4077; B60T 13/146; B60T 13/147; B60T 13/686
See application file for complete search history.

(56) References Cited

U.S. PATENT DOCUMENTS

| | | | | |
|---|---|---|---|---|
| 2015/0127226 | A1* | 5/2015 | Takeuchi | B60T 13/686 701/48 |
| 2016/0339887 | A1* | 11/2016 | Okano | B60T 8/4077 |
| 2017/0120882 | A1* | 5/2017 | Ninoyu | B60T 8/4077 |
| 2018/0208169 | A1* | 7/2018 | Ninoyu | B60T 13/145 |
| 2019/0023242 | A1* | 1/2019 | Ozeki | B60T 8/17 |
| 2019/0077385 | A1* | 3/2019 | Okano | B60T 7/042 |

FOREIGN PATENT DOCUMENTS

JP 2017030421 A 2/2017

* cited by examiner

*Primary Examiner* — Bradley T King
(74) *Attorney, Agent, or Firm* — Buchanan Ingersoll & Rooney PC (57) ABSTRACT

The vehicle braking device includes a pilot pressure control portion which executes normal control in which the pilot pressure is controlled in response to the target value of the servo pressure and shortening control in which the change amount of the pilot pressure per unit time is greater than the change amount under the normal control in a mutually different timing, a state judging portion which judges the state of the master piston relating hysteresis of sliding resistance of the master piston based on the detection result of the servo pressure detecting portion or the liquid pressure co-relating with the servo premeasure and a control switching over portion which terminates the shortening control based on the detection result of the servo pressure detecting portion and the detection result of the state judging portion.

3 Claims, 2 Drawing Sheets

VEHICLE BRAKING DEVICE

This application claims priority under 35 U.S.C. 119 with respect to Japanese Application No. 2018-069088 filed in Japan on Mar. 30, 2018, the entire content of which is herein incorporated by reference.

FIELD OF INVENTION

This invention relates to a vehicle braking device.

BACKGROUND OF INVENTION

In a vehicle braking device, a regulator is used as a part of the booster mechanism and such regulator is equipped with a cylinder body and a spool. The regulator is a mechanism which adjusts the output pressure depending on the position of the spool which is slidably moved in the cylinder body by the pilot pressure. In more detail, the cylinder body includes a pressure chamber which generates an output pressure to the servo chamber of the master cylinder, a high pressure port positioned between the high pressure source and the pressure chamber and a low pressure port positioned between the low pressure source and the pressure chamber.

The spool is structured such that the spool is slidably movable in the cylinder body within a predetermined range which includes a closing range within which the spool closes both the high pressure port and the low pressure port and an opening range within which the spool closes one of the high pressure port and the low pressure port and at the same time opens the other of the high pressure port and the low pressure port. The liquid pressure (output pressure) of the pressure chamber is maintained when both the high pressure port and the low pressure port are closed and is increased towards the pressure level of the high pressure source when only the high pressure port is opened. Further, the liquid pressure (output pressure) is decreased towards the pressure of the low pressure source, (for example, to the atmospheric pressure level) when only the low pressure port is opened. In other words, the output pressure is maintained when the spool is positioned within the closing range and is increased or decreased when the spool is positioned within the opening range.

Under such structure, when the spool is moved towards the opening range, passing through the closing range in response to the pressure increase instruction or pressure decrease instruction, the output pressure does not increase or decrease to a pressure level corresponding to an operation amount as long as the spool is slidably moving within the closing range. This slidably moving section corresponds to the non-effective section (non-effective liquid amount) where the master pressure (output pressure of the master cylinder) does not respond to the pressure increase or decrease instruction. To this structure, for example, according to the liquid pressure generating device described in a patent publication JP2017-30421 A, when the spool is moved towards the opening range, passing through the closing range, a shortening control is executed which further increases the change inclination of the pilot pressure compared to a normal operation. Thus, the time of the sliding movement of the spool in the non-effective section can be shortened thereby improve the responsiveness of the braking operation.

RELATED ART

[Patent Literature 1] JP2017-30421A

DISCUSSION OF RELATED ART

Whether the shortening control is terminated or not is judged based on, for example, the change amount of the servo pressure. However, due to the structural reason of the regulator, the change amount of the servo pressure may differ from each other for the same sliding moving amount of the spool even in the same closing range. For this reason, even the sliding moving amount of the spool is not sufficient, the shortening control may be terminated. Thus, the conventional vehicle braking device explained above still has to be improved with respect to a point of accuracy of termination judgement of the shortening control.

Accordingly, this invention was made in consideration with the above-mentioned situation and the invention pertains to provide a vehicle braking device which can improve an accuracy of termination judgement of a shortening control which shortens the time for sliding movement of the spool within the closing range.

SUMMARY OF INVENTION

The vehicle braking device according to the invention includes a master cylinder which includes a master cylinder body, a master piston slidably movable within the master cylinder body and a servo chamber in which a servo pressure is generated which slidably moves the master piston, a servo pressure detecting portion which detects the servo pressure, a hydraulic pressure generating portion which includes a cylinder body formed with a high pressure port and a low pressure port, a spool slidably movable in the cylinder body within a predetermined range which includes a closing range within which the spool closes both the high pressure port and the low pressure port and an opening range within which the spool closes one of the high pressure port and the low pressure port and at the same time opens the other of the high pressure port and the low pressure port, a pilot chamber in which a pilot pressure is generated which slidably moves the spool and a pressure chamber which is connected to the servo chamber and which volume is variable by a slidable movement of the spool, a high pressure source which supplies the pressure chamber with an operating liquid equal to or more than a predetermined pressure via the high pressure port under the high pressure port being opened, a low pressure source which maintains a pressure therein lower than the predetermined pressure and which is connected to the pressure chamber via the low pressure port under the low pressure port being opened, a pilot pressure control portion which executes a normal control which controls the pilot pressure in response to a target value of the servo pressure and a shortening control which controls a change amount of the pilot pressure per unit time which slidably moves the spool within the closing range to be larger than the change amount of the pilot pressure per unit time under an execution of the normal control at a mutually different timing between the normal control and the shortening control, a state judging portion which judges a state of the master piston relating to a hysteresis thereof with respect to a sliding resistance based on a detection result of the servo pressure detecting portion or a liquid pressure correlative to the servo pressure and a control switching over portion which terminates the shortening control based on the detection result of the servo pressure detecting portion and a judging result of the state judging portion.

When the spool is slidably moving within the closing range, the pressure chamber and the servo chamber become a sealed state and in response to the volume change of the pressure chamber due to the slidable movement of the spool, the servo pressure becomes changeable. This change amount of the servo pressure may be different depending on the rigidity (hard to change volume) of the pressure chamber and the servo chamber under the same spool sliding movement amount. The rigidity changes depending on the sliding resistance of the master piston. The sliding resistance of the master piston generates a hysteresis and for example, the sliding resistance of the master piston when the master piston advances after the retreatment movement thereof becomes larger than the sliding resistance generated when the master piston advances and stops and thereafter again advances. In other words, the rigidity of the servo chamber becomes higher in the former case than in the latter case and regarding to the slidable movement of the spool, the servo pressure becomes easy to be raised in the former case than in the latter case.

According to the invention, the accuracy of judgment of the termination of shortening control can be improved by judging the state of the master piston relating to the hysteresis of the sliding resistance (judgement of magnitude of the sliding resistance) and by adding the state of the master piston relating to an easiness of servo pressure change to a termination judging element.

BRIEF EXPLANATION OF ATTACHED DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

EMBODIMENTS FOR IMPLEMENTING THE INVENTION

Figure 1:
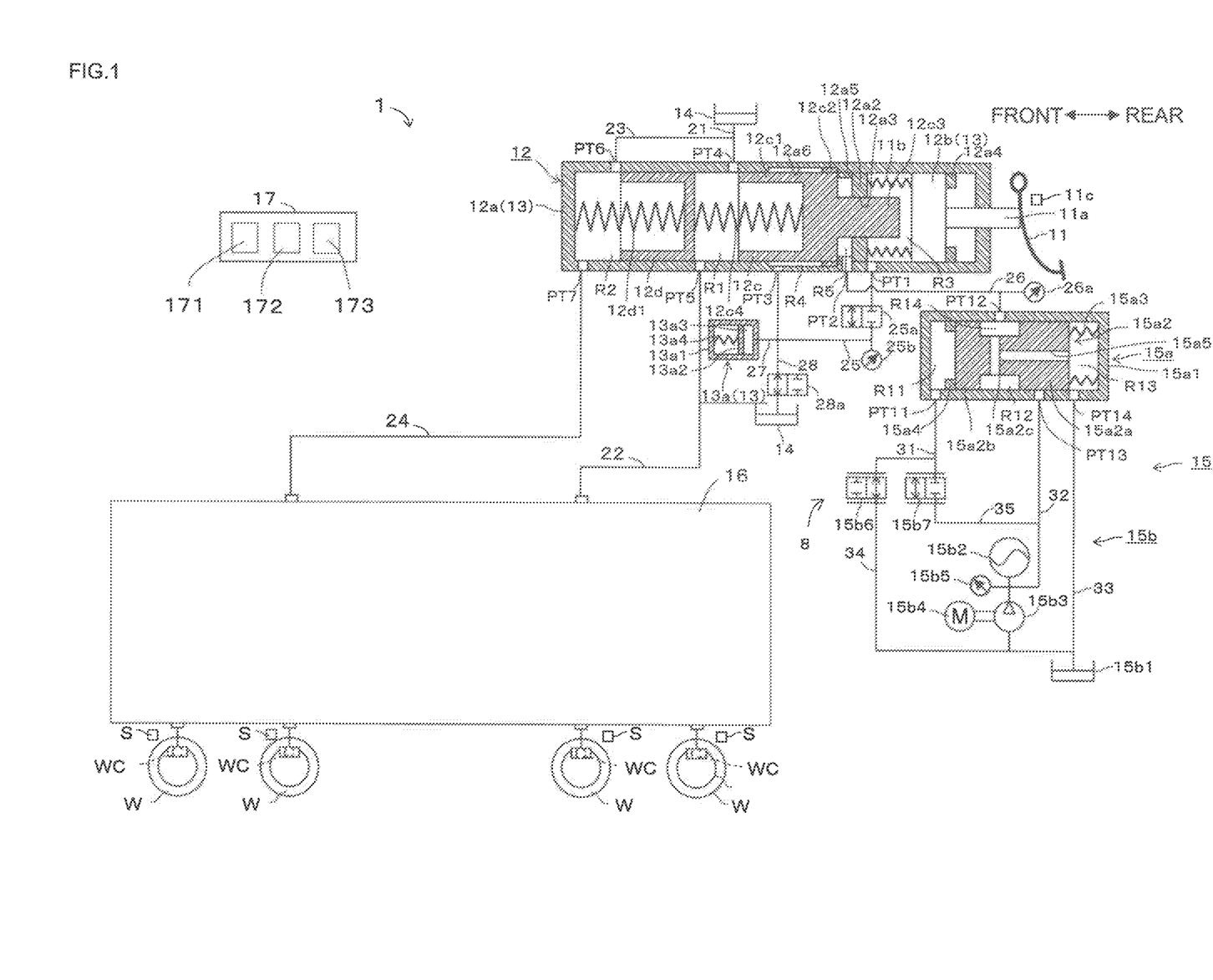
FIG. 1 is a structural view of a vehicle braking device according to an embodiment of the invention.

The embodiment of the vehicle braking device according to one embodiment of the invention adapted to a vehicle will be explained hereinafter with reference to the attached drawings. The vehicle is equipped with a vehicle braking device 1 which applies brakes to the vehicle by applying the hydraulic pressure braking force directly to each vehicle wheel W. The vehicle braking device 1 includes a brake pedal 11, a master cylinder 12, a stroke simulator portion 13, a reservoir 14, a booster mechanism 15, an actuator 16, a brake ECU 17 and a wheel cylinder WC, as shown in FIG. 1.

The wheel cylinder WC restricts the rotation of the respective wheels W and is disposed in the caliper. The wheel cylinder WC serves as a braking force applying mechanism which applies braking force to the wheels W of the vehicle based on the pressure of the operating liquid from the actuator 16. The brake pedal 11 is a brake operating member. The brake pedal 11 is connected to the stroke simulator portion 13 and the master cylinder 12 via the operating rod 11a.

A stroke sensor 11c which detects a stroke (operating amount) of the brake pedal 11 is provided in the vicinity of the brake pedal 11. The brake ECU 17 is connected to this stroke sensor 11c and the detected signal from the stroke sensor 11c is outputted to the brake ECU 17.

The master cylinder 12 supplies the actuator 16 with the brake fluid in response to the stroke of the brake pedal 11 and is formed by a master cylinder body 12a, an input piston 12b, a first master piston 12c and a second master piston 12d, etc.

The master cylinder body 12a is formed in a substantially bottomed cylinder shape. The master cylinder body 12a includes therein a partition wall portion 12a2 which extends inwardly with a shape of flange at the inner peripheral side of the master cylinder body 12a. An inner circumferential surface of the partition wall portion 12a2 is provided with a through hole 12a3 at a central portion thereof, penetrating through the partition wall portion 12a2 in front and rearward direction. The master cylinder body 12a is provided with a first master piston 12c and a second master piston 12d at an inner peripheral portion thereof at a portion further front side than the partition wall portion 12a2. The first and the second master pistons 12c and 12d are liquid-tightly movable in an axial direction in the master cylinder body 12a.

The master cylinder body 12a is provided with an input piston 12b at an inner peripheral portion thereof at a portion further rear side than the partition wall portion 12a2. The input piston 12b is liquid-tightly movable in an axial direction in the master cylinder body 12a. The input piston 12b is a piston which slidably moves within the master cylinder body 12a in response to the operation of the brake pedal 11.

The operating rod 11a which is operable in association with the brake pedal 11 is connected to the input piston 12b. The input piston 12b is biased in a direction where the volume of the first hydraulic pressure chamber R3 expands, i.e., in a rearward direction (right direction as viewed in the drawing) by means of a compression spring 11b. When the brake pedal 11 is depressed, the operating rod 11a advances forward overcoming the biasing force of the compression spring 11b. By this advance movement of the operating rod 11a, the input piston 12b advances in association with the movement of the operating rod 11a. When the depression operation of the brake pedal 11 is released, the input piston 12b retreats by the biasing force of the compression spring 11b and is brought into contact with a restriction projecting portion 12a4 for positioning.

The first master piston 12c includes a pressurizing cylindrical portion 12c1, a flange portion 12c2 and a projecting portion 12c3 in order from the front and these portions are formed integrally as a unit. The pressurizing cylindrical portion 12c1 is formed in a substantially bottomed cylinder shape having an opening at a front portion thereof. The pressurizing cylindrical portion 12c1 is liquid-tightly movably provided in the inner peripheral surface of the master cylinder body 12a. A coil spring-shaped biasing member 12c4 is provided in the inner space of the pressurizing cylindrical portion 12c1 between the first master piston 12c and the second master piston 12d. The first master piston 12c is biased in a rear direction by the coil spring 12c4. In other words, the first master piston 12c is biased by the coil spring 12c4 in a rearward direction and is finally brought into contact with a restriction projecting portion 12a5 for positioning. This position is defined to be the initial position (original position) at the time the depression operation of the brake pedal 11 is released.

The flange portion 12c2 is formed to have a greater diameter than the diameter of the pressurizing cylindrical portion 12c1 and is liquid-tightly and slidably disposed on an inner peripheral surface of a large diameter portion 12a6 in the master cylinder body 12a. The projecting portion 12c3 is formed to have a smaller diameter than the diameter of the pressurizing cylindrical portion 12*c*1 and is slidably in liquid-tightly provided on the through hole 12*a*3 of the partition wall portion 12*a*2. The rear end of the projecting portion 12*c*3 projects into an inner space of the master cylinder body 12*a*, passing through the through hole 12*a*3 and is separated from the inner peripheral surface of the master cylinder body 12*a*. The rear end surface of the projecting portion 12*c*3 is separated from the bottom surface of the input piston 12*b* and the separation distance is formed to be variable.

The second master piston 12*d* is arranged in the master cylinder body 12*a* at a front side relative to the first master piston 12*c*. The second master piston 12*d* is formed in a substantially bottomed cylinder shape having an opening at a front portion thereof. A coil spring 12*d*1 which serves as a biasing member is disposed in the inner space of the second master piston 12*d* between the second piston 12*d* and a closed inner bottom surface of the master cylinder body 12*a*. The second master piston 12*d* is biased by the coil spring 12*d*1 in a rearward direction. In other words, the second master piston 12*d* is biased by the coil spring 12*d*1 towards a predetermined initial position.

A first master chamber R1, a second master chamber R2, a first hydraulic pressure chamber R3, a second hydraulic pressure chamber R4 and a servo chamber R5 are formed in the master cylinder 12. The first master chamber R1 is defined by the inner peripheral surface of the master cylinder body 12*a*, the first master piston 12*c* (front side of the pressurizing cylindrical portion 12*c*1) and the second master piston 12*d*. The first master chamber R1 is connected to the reservoir 14 via the hydraulic passage 21 which is connected to the port PT4. Further, the first master chamber R1 is connected to the actuator 16 via the hydraulic passage 22 which is connected to the port PT5.

The second master chamber R2 is defined by the inner peripheral surface of the master cylinder body 12*a* and the front side of the second master piston 12*d*. The second master chamber R2 is connected to the reservoir 14 via the hydraulic passage 23 which is connected to the port PT6. Further, the second master chamber R2 is connected to the actuator 16 via the hydraulic passage 24 which is connected to the port PT7.

The first hydraulic pressure chamber R3 is formed between the partition wall portion 12*a*2 and the input piston 12*b* and is defined by the inner peripheral surface of the master cylinder body 12*a*, the partition wall portion 12*a*2, the projecting portion 12*c*3 of the first master piston 12*c* and the input piston 12*b*. The second hydraulic pressure chamber R4 is formed at the side of the pressurizing cylindrical portion 12*c*1 of the first master piston 12*c* and is defined by the inner peripheral surface of the large diameter portion 12*a*6 of the master cylinder body 12*a*, the pressurizing cylindrical portion 12*c*1 and the flange portion 12*c*2. The first hydraulic pressure chamber R3 is connected to the second hydraulic pressure chamber R4 via the hydraulic passage 25 which is connected to the port PT1 and the port PT3.

The servo chamber R5 is formed between the partition wall portion 12*a*2 and the pressurizing cylindrical portion 12*c*1 of the first master piston 12*c* and is defined by the inner peripheral surface of the master cylinder body 12*a*, the partition wall portion 12*a*2, the projecting portion 12*c*3 of the first master piston 12*c* and the pressurizing cylindrical portion 12*c*1. The servo chamber R5 is connected to the output chamber R12 via the hydraulic passage 26 which is connected to the port PT2.

The pressure sensor 26*a* (corresponding to the "servo pressure detecting portion") is a sensor that detects the servo pressure which is supplied to the servo chamber R5 and is connected to the hydraulic passage 26. The pressure sensor 26*a* sends the detection signal (detection result) to the brake ECU 17. The servo pressure detected at the pressure sensor 26*a* is an actual value of the hydraulic pressure in the servo chamber R5 and hereinafter is referred to as the actual servo pressure.

The stroke simulator portion 13 includes the master cylinder body 12*a*, the input piston 12*b*, the first hydraulic pressure chamber R3 and a stroke simulator 13*a* which is in fluid communication with the first hydraulic pressure chamber R3. The first hydraulic pressure chamber R3 is in fluid communication with the stroke simulator 13*a* via the hydraulic passages 25 and 27 which are connected to the port PT1. It is noted that the first hydraulic pressure chamber R3 is in fluid communication with the reservoir 14 via a connection passage (not shown).

The stroke simulator 13*a* generates a reaction force which magnitude depends on the operation state of the brake pedal 11. The stroke simulator 13*a* includes a cylindrical portion 13*a*1, a piston portion 13*a*2, a reaction force hydraulic pressure chamber 13*a*3 and a spring 13*a*4. The piston portion 13*a*2 liquid-tightly slidably moves within the cylindrical portion 13*a*1 in response to the braking operation by the brake pedal 11. The reaction force hydraulic pressure chamber 13*a*3 is formed between and defined by the cylindrical portion 13*a*1 and the piston portion 13*a*2. The reaction force hydraulic pressure chamber 13*a*3 is in fluid communication with the first hydraulic pressure chamber R3 and the second hydraulic pressure chamber R4 via the hydraulic passages 27 and 25. The spring 13*a*4 biases the piston portion 13*a*2 in a direction where the volume of the reaction force hydraulic pressure chamber 13*a*3 decreases.

It is noted that the first control valve 25*a* which is a normally closed type electromagnetic valve is disposed in the hydraulic passage 25. The second control valve 28*a* which is a normally open type electromagnetic valve is disposed in the hydraulic passage 28 which connects the hydraulic passage 25 and the reservoir 14. When the first control valve 25*a* is in a closed state, the fluid communication between the first and the second hydraulic pressure chambers R3 and R4 is interrupted. This fluid communication interruption keeps the constant separation distance between the input piston 12*b* and the first master piston 12*c* to allow the coordinative movement therebetween. Further, when the first control valve 25*a* is in an open state, the fluid communication between the first hydraulic pressure chamber R3 and the second hydraulic pressure chamber R4 is established. Thus, the volume change of the first and the second hydraulic pressure chambers R3 and R4 caused by the advance or retreat movement of the first master piston 12*c* can be absorbed by the transfer of the brake fluid.

The pressure sensor 25*b* is a sensor that detects the hydraulic pressure (the reaction force hydraulic pressure) in the second hydraulic pressure chamber R4 and the first hydraulic pressure chamber R3 and is connected to the hydraulic passage 25. The pressure sensor 25*b* also serves as a sensor that detects an operating force operating on the brake pedal 11 and has a mutual relationship with the stroke of the brake pedal 11. The pressure sensor 25*b* detects the pressure in the second hydraulic pressure chamber R4 when the first control valve 25*a* is in a closed state and also detects the pressure in the first hydraulic pressure chamber R3 which is in fluid communication with the second hydraulic pressure chamber R4 when the first control valve 25*a* is in an open state. The pressure sensor 25b sends the detected signal (detection result) to the brake ECU 17.

The booster mechanism 15 is a mechanism which generates a servo pressure in response to the stroke of the brake pedal 11. The booster mechanism 15 is a hydraulic pressure generating device which outputs an output pressure (in the embodiment, the servo pressure) by the operation of the inputted input pressure (in this embodiment, the pilot pressure) and is the hydraulic pressure generating device which generates a response delay of the output pressure relative to the input pressure at the initial stage of pressure increasing operation or pressure decreasing operation when the output pressure is intended to be increased or decreased. The booster mechanism 15 includes a regulator (corresponding to "hydraulic pressure generating portion") 15a and a pressure supply device 15b.

The regulator 15a is configured to have a cylinder body 15a1 and a spool 15a2 which slides in the cylinder body 15al. The regulator 15a includes a pilot chamber R11, an output chamber R12 and a third hydraulic pressure chamber R13.

The pilot chamber R11 is defined by the cylinder body 15a1 and a front end surface of a second large diameter portion 15a2b of the spool 15a2. The pilot chamber R11 is connected to the pressure decreasing valve 15b6 and the pressure increasing valve 15b7 (hydraulic passage 31) which are connected to the port PT11. A restriction projecting portion 15a4 is provided on the inner peripheral surface of the cylinder body 15a1 to position the spool 15a2 by contacting the second large diameter portion 15a2b with the restriction projecting portion 15a4.

The output chamber R12 is defined by the cylinder body 15a1 and the small diameter portion 15a2c, the rear end surface of the second large diameter portion 15a2b and the front end surface of the first large diameter portion 15a2a of the spool 15a2. The output chamber R12 is connected to the servo chamber R5 via the port PT12, the hydraulic passage 26 and the port PT2. Further, the output chamber R12 is connectible with the accumulator 15b2 via the high pressure port PT13 and the hydraulic passage 32.

The third hydraulic pressure chamber R13 is defined by the cylinder body 15a1 and the rear end surface of the first large diameter portion 15a2a of the spool 15a2. The third hydraulic pressure chamber r13 is connectible with the reservoir 15b1 via the low pressure port PT14 and the hydraulic passage 33. A spring 15a3, which biases the spool 15a2 in a direction where the volume of the third hydraulic pressure chamber R13 increases, is disposed in the third hydraulic pressure chamber R13.

The spool 15a2 includes the first large diameter portion 15a2a, the second large diameter portion 15a2b and the small diameter portion 15a2c. The first large diameter portion 15a2a and the second large diameter portion 15a2b are structured to be liquid-tightly movable within the cylinder body 15al. The small diameter portion 15a2c is arranged between the first large diameter portion 15a2a and the second large diameter portion 15a2b and is formed integrally therewith as a unit. The small diameter portion 15a2c is formed to have a diameter smaller than the first large diameter portion 15a2a and the second large diameter portion 15a2b.

Further, a communication passage 15a5 which connects the output chamber R12 and the third hydraulic pressure chamber R13 is formed in the spool 15a2. The pressure chamber R14 is formed by the output chamber R12 and the third hydraulic pressure chamber R13. The pressure chamber R14 decreases the volume thereof as the spool 15a2 retreats and increases the volume thereof as the spool 15a2 advances. As explained above, the pressure chamber R14 is connected to the servo chamber R5 and forms a portion that the volume thereof changes in response to the slidable movement of the spool 15a2.

The pressure supply device 15b serves also as a drive portion which drives the spool 15a2 to slidably move. The pressure supply device 15b includes a reservoir 15b1 (which corresponds to the "low pressure source"), an accumulator 15b2 (which corresponds to the "high pressure source") that accumulates the brake fluid therein, a pump 15b3 which suctions the brake fluid in the reservoir 15b1 and pumps the suctioned brake into the accumulator 15b2 and an electric motor 15b4 which drives the pump 15b3. The reservoir 15b1 is exposed to the atmospheric pressure and the hydraulic pressure in the reservoir 15b1 is the same level with the atmospheric pressure. The pressure (here, the atmospheric pressure in the reservoir 15b1) is lower than the pressure in the accumulator 15b2. The pressure supply device 15b is provided with a pressure sensor 15b5 which detects the pressure of the brake fluid supplied from the accumulator 15b2 and outputs the detected result to the brake ECU 17.

Further, the pressure supply device 15b includes a pressure decreasing valve 15b6 and a pressure increasing valve 15b7. In more concrete, the pressure decreasing valve 15b6 is a normally open type electromagnetic valve which opens in a non-energized state and the flow-rate of the pressure decreasing valve 15b6 is controlled by the instructions from the brake ECU 17. One side of the pressure decreasing valve 15b6 is connected to the pilot chamber R11 via the hydraulic passage 31 and the other side thereof is connected to the reservoir 15b1 via the hydraulic passage 34. The pressure increasing valve 15b7 is a normally closed type electromagnetic valve which closes in the non-energized state and the flow-rate of the pressure increasing valve 15b7 is controlled by the instructions from the brake ECU 17. One side of the pressure increasing valve 15b7 is connected to the pilot chamber R11 via the hydraulic passage 31 and the other side thereof is connected to the accumulator 15b2 via the hydraulic passage 35 and the hydraulic passage 32 which is connected to the hydraulic passage 35.

The operation of the regulator 15a will be explained briefly hereinafter. In the case where the pilot pressure (hydraulic pressure in the pilot chamber R11) is not supplied to the pilot chamber R11 from the pressure decreasing valve 15b6 and the pressure increasing valve 15b7, the spool 15a2 is positioned at the initial position by means of a biasing force of the spring 15a3 (See FIG. 1). The initial position of the spool 15a2 is determined by the contact of the front end surface of the spool 15a2 with the restriction projecting portion 15a4. This initial position is the position where the rear end surface of the spool 15a2 positions adjacent to the front end portion of the low pressure port PT14.

As explained, when the spool 15a2 is in the initial position, the low pressure port PT14 and the port PT12 are in fluid communication with each other through the pressure chamber R14 and at the same time the high pressure port PT13 is closed by the spool 15a2.

The pilot pressure is formed by the pressure decreasing valve 15b6 and the pressure increasing valve 15b7 in response to the stroke of the brake pedal 11. In the case where the pilot pressure increases, the spool 15a2 moves in a rearward direction (right side in FIG. 1), overcoming the biasing force of the spring 15a3. The spool 15a2 moves to the position where the high pressure port PT13, which has been closed by the spool 15a2, is open. The low pressure port PT14 which has been in the open state, is closed by the spool 15*a*2. This position of the spool 15*a*2 is defined to be the "pressure increasing position". Under this state, the pressure chamber R14 and the accumulator 15*b*2 are in fluid communication via the high pressure port PT13 (Pressure increasing state). The rear end surface of the second large diameter portion 15*a*2*b* of the spool 15*a*2 receives a force corresponding to the servo pressure.

By the force balance between the pushing force at the front end surface of the second large diameter portion 15*a*2*b*2 of the spool 15*a*2 and the resultant force of the force corresponding to the servo pressure and the biasing force of the spring 15*a*3, the position of the spool 15*a*2 is fixed. This position of the spool 15*a*2 at which the high pressure port PT13 and the low pressure port PT14 are closed by the spool 15*a*2 is defined to be the "holding position". The fluid communication between the pressure chamber R14 and the accumulator 15*b*2 and the reservoir 15*b*1 is interrupted. (Holding state).

In the case where the pilot pressure decreases, the spool 15*a*2 which is in the holding position now moves in a frontward direction by the biasing force of the spring 15*a*3. Then, the high pressure port PT13 which has been in the closed state by the spool 15*a*2 keeps the closed state. The low pressure port PT14 which has been in the closed state is open. This position of the spool 15*a*2 in this state is defined to be the "pressure decreasing position". Under this state, the pressure chamber R14 and the reservoir 15*b*1 are in fluid communication via the low pressure port PT14 (Pressure decreasing state). It is noted here that under the initial position of the spool 15*a*2 (the pilot pressure equals to the pressure in the reservoir 15*b*1), the high pressure port PT13 is closed while the low pressure port PT14 is open and the initial position corresponds to the pressure decreasing position.

It is noted here that in a sliding range of the spool 15*a*2, a range where the high pressure port PT13 and the low pressure port PT14 are both closed is defined to be the "closing range" and a range one of the high pressure port PT13 and the low pressure port PT14 is closed and the other thereof is open is defined to be the "opening range". When the spool 15*a*2 is in the closing range, it means that the spool 15*a*2 is positioned at the holding position. Further, when the spool 15*a*2 is in the opening range, it means that the spool 15*a*2 is positioned at the pressure increasing or decreasing position. Thus, the spool 15*a*2 is slidable in the cylinder body 15*a*1 within the sliding range including the closing range and the opening range.

The booster mechanism 15 generates the pilot pressure in the pilot chamber R11 in response to the stroke of the brake pedal 11 by the operation of the pressure decreasing valve 15*b* and the pressure increasing valve 15*b*7. Thus, the servo pressure is generated in the servo chamber R5 in response to the stroke of the brake pedal 11 by the pilot pressure. The master cylinder 12 supplies the wheel cylinder WC via the actuator 16 with the master pressure (liquid pressure in the first master chamber R1 and the second master chamber R2) generated in response to the stroke of the brake pedal 11. The pressure decreasing valve 15*b*6 and the pressure increasing valve 15*b*7 form a valve mechanism which adjusts the flow of the brake fluid into or out of the servo chamber R5.

The actuator 16 is disposed in the fluid passage between the master cylinder 12 and the wheel cylinder WC for controlling the hydraulic pressure to be applied to each wheel cylinder WC. The actuator 16 is formed by electromagnetic valve, motor and pump (these are not shown), etc. The actuator 16 executes an anti-skid control (ABS control), etc., based on the instructions from the brake ECU 17.

The brake ECU 17 is an electronic control unit including CPU and memory. The brake ECU 17 receives detection result from respective sensors and based on the detection result, controls respective devices (electromagnetic valves, etc.). Further, the brake ECU 17 receives a detection signal from the vehicle wheel speed sensor S which is equipped in each wheel W of the vehicle.

The brake ECU 17 includes a control portion 171, a state judging portion 172 and a control switching over portion 173 as a function. The control portion 171 is configured to execute two different controls mutually in a different timing, one of which is a normal control for controlling the pilot pressure in response to a target value of the servo pressure (hereinafter, referred to as target servo pressure) and the other of which is a shortening control for controlling the pilot pressure based on the target servo pressure taking the time that the spool 15*a*2 slides in the closing range shorter than the time taking at the normal control. The control portion 171 sets the target servo pressure based on the stroke of the brake pedal 11 (detected value of the stroke sensor 11*c*).

The control portion 171 executes pressure increasing control, pressure holding control or pressure decreasing control to the pressure in the servo chamber R5 by controlling the pressure decreasing valve 15*b*6 and the pressure increasing valve 15*b*7 so that the actual servo pressure approximates the target servo pressure under normal control mode. The shortening control mode is a control that increases the change amount of the pilot pressure per unit time which makes the spool 15*a*2 slide within the closing range greater than the change amount of the pilot pressure per unit time under the normal control mode. In other words, in the shortening control mode, the sliding speed of the spool 15*a*2 within the closing range when the spool 15*a*2 moves into the opening range via the closing range is set to be faster than the speed under the normal control mode. Upon executing the shortening control, the control portion 171 sets the flow amount of the operating liquid per unit time flowing into or out of the pilot chamber R11 to be greater than the flow amount under the normal control. For example, when the control portion 171 executes pressure increasing control upon the spool 15*a*2 being at the holding position, the control portion 171 executes the shortening control for the time from the time when the spool 15*a*2 is positioned at the holding position to the time when the spool 15*a*2 reaches to the pressure increasing position and executes the normal control after the spool 15*a*2 reached to the pressure increasing position. Thus, within the sliding range of the spool 15*a*2, the sliding time in the closing range where the control amount of the pilot pressure does not reflect on the actual servo pressure can be shortened. This can improve the responsiveness of brake operation. The control portion 171, the pressure decreasing valve 15*b*6 and the pressure increasing valve 15*b*7 can be said to form a pilot pressure control portion 8 which selectively executes the normal control and the shortening control.

The state judging portion 172 is configured to judge the state of master piton 12*c*, 12*d* relating to hysteresis of the master piston 12*c* and 12*d* with respect to a sliding resistance, based on the actual servo pressure (or the liquid pressure co-relating with the servo pressure, for example, the master pressure). The sliding resistance in the case where the master piston 12*c* and 12*d* retreats and stops and thereafter advances becomes greater than the sliding resistance in the case where the master piston 12*c* and 12*d* advances and stops and thereafter advances again. Similarly, the sliding resistance in the case where the master piston 12*c* and 12*d* advances and stops and thereafter retreats becomes greater than the sliding resistance in the case where the master piston 12c and 12d retreats and stops and thereafter retreats again. This phenomenon is caused by the movement and deformation, etc., of the sealing members (not shown). Thus, the sliding resistance of the master piston 12c, 12d changes depending on the state of the master piston 12c, 12d (sliding direction before stopping). This phenomenon is the hysteresis of the master piston 12c and 12d with respect to a sliding resistance.

The state of the master piston 12c, 12d relating to the hysteresis (this may be the "direction" of the hysteresis) when the sliding direction of the master piston 12c, 12d before stopping is a frontward direction is referred to as the state of "pressure increasing performance characteristics" and the state when the sliding direction of the master piston 12c, 12d before stopping is a rearward direction is referred to as the state of "pressure decreasing performance characteristics". Under the pressure increasing performance characteristics, the sliding resistance in the case of pressure decreasing becomes greater than the sliding resistance in the case of pressure increasing. Under the pressure decreasing performance characteristics, the sliding resistance in the case of pressure increasing becomes greater than the sliding resistance in the case of pressure decreasing.

The state judging portion 172 judges that the master piston 12c, 12d is in the state of pressure decreasing performance characteristics when the master piston 12c, 12d is in the initial position, i.e., when the actual servo pressure is the atmospheric pressure. When the master piston 12c, 12d is in the initial position, the master piston 12c, 12d is in the state that the master piston 12c, 12d slides rearward, which is the state of pressure decreasing performance characteristics. It is noted that upon factory shipment, since the master piston 12c, 12d is inserted into the master cylinder 12a from the front end portion thereof, it is judged that the state of the master piston 12c, 12d is in the state of pressure decreasing performance characteristics, which judgement does not involve any issue of problem. However, the state of the master piston only upon factory shipment may be set to the state of an initial performance characteristics which is different from the states of pressure increasing performance characteristics and the pressure decreasing performance characteristics.

The state judging portion 172 sets a first inversion threshold value as the performance characteristics inversion threshold value relative to the increase amount of the actual servo pressure when judging that the state of the master piston 12c, 12d is the pressure decreasing performance characteristics. When the increase amount of the actual servo pressure upon pressure decreasing performance characteristics exceeds the first inversion threshold value, the state judging portion 172 judges that the performance characteristics is inverted and judges that the state of the master piston 12c, 12d is in the pressure increasing performance characteristics. The master piston 12c, 12d receives a sliding resistance for increasing the pressure (advances the piston) upon pressure decreasing performance characteristics greater than the sliding resistance for decreasing the pressure (retreats the piston) upon pressure decreasing performance characteristics and accordingly, the change amount (increase amount) of the servo pressure necessary for starting slidable movement of the master piston 12c, 12d becomes large.

The first inversion threshold value is set to be the liquid change amount necessary for advancing the master piston 12c, 12d which is stopped at the pressure decreasing performance characteristics and is set to a value reflecting the hysteresis direction of the sliding resistance. The state judging portion 172 memorizes the minimum value of the actual servo pressure after the state switches over from the control/state other than the pressure increasing control to the pressure increasing control and continues such renewals. Then, the state judging portion 172 compares the memorized minimum value of the actual servo pressure with the current value of the actual servo pressure per every predetermined time to calculate the increase amount of the actual servo pressure. It is noted here that even the pressure decreasing control is executed upon pressure decreasing performance characteristics, the performance characteristics is not inverted.

Further, the state judging portion 172 sets a second inversion threshold value as the performance characteristics inversion threshold value relative to the decrease amount of the actual servo pressure when judging that the state of the master piston 12c, 12d is the pressure increasing performance characteristics. When the decrease amount of the actual servo pressure upon pressure increasing performance characteristics exceeds the second inversion threshold value, the state judging portion 172 judges that the performance characteristics is inverted and judges that the state of the master piston 12c, 12d is in the pressure decreasing performance characteristics. The master piston 12c, 12d receives a sliding resistance for decreasing the pressure (retreats the piston) upon pressure increasing performance characteristics greater than the sliding resistance for increasing the pressure (advances the piston) upon pressure increasing performance characteristics and accordingly, the change amount (decrease amount) of the servo pressure necessary for starting slidable movement of the master piston 12c, 12d becomes large.

The second inversion threshold value is set to be the liquid change amount necessary for retreating the master piston 12c, 12d which is stopped at the pressure increasing performance characteristics and is set to a value reflecting the hysteresis direction of the sliding resistance. The state judging portion 172 memorizes the maximum value of the actual servo pressure after the state switches over from the controVstate other than the pressure decreasing control to the pressure decreasing control and continues such renewals. Then, the state judging portion 172 compares the memorized maximum value of the actual servo pressure with the current value of the actual servo pressure per every predetermined time to calculate the decrease amount of the actual servo pressure. It is noted here that even the pressure increasing control is executed upon pressure increasing performance characteristics, the performance characteristics is not inverted.

The control switching over portion 173 is configured to terminate the shortening control by the control portion 171 based on the actual servo pressure and the judgement result of the state judging portion 172. The control switching over portion 173 memorizes a normal threshold value (can be referred to as normal threshold change amount) which terminates the shortening control relative to the change amount of the actual servo pressure from the time the control is switched over to the pressure increasing control or the pressure decreasing control. For example, a conventional control is made such that when the control mode is changed from the holding control to the pressure increasing control or the pressure decreasing control, the shortening control is executed and in spite of the state of the master piston 12c, 12d, when the change amount of the actual servo pressure exceeds the normal threshold value, the shortening control is terminated.

However, the control switching over portion 173 according to the embodiment memorizes a special threshold value (can be referred to as a special threshold change amount) which is a change amount greater than the normal threshold value, in addition to the normal threshold value (normal threshold value<special threshold value). The control switching over portion 173 sets the special threshold value as a threshold value for terminating the shortening control since the sliding resistance for advancing the piston is greater than the sliding resistance upon the pressure increasing performance characteristics when the judgement result of the state judging portion 172 is the state of pressure decreasing performance characteristics during the pressure increasing control of the actual servo pressure. The special threshold value is a value which reflects the hysteresis direction of the sliding resistance and is set to the liquid pressure change amount corresponding to the sliding resistance worth. When the change amount (increase amount) of the actual servo pressure exceeds the special threshold value, the control switching over portion 173 executes normal control by instructing the control portion 171 to terminate the shortening control.

On the other hand, the control switching over portion 173 sets the normal threshold value as a threshold value for terminating the shortening control when the judgement result of the state judging portion 172 is the state of pressure increasing performance characteristics during the pressure increasing control of the actual servo pressure. The control switching over portion 173 executes normal control by instructing the control portion 171 to terminate the shortening control when the change amount (increase amount) of the actual servo pressure exceeds the normal threshold value.

The control switching over portion 173 according to the embodiment sets the special threshold value as a threshold value for terminating the shortening control since the sliding resistance for retreating the piston is greater than the sliding resistance upon the pressure decreasing performance characteristics when the judgement result of the state judging portion 172 is the state of pressure increasing performance characteristics during the pressure decreasing control of the actual servo pressure. When the change amount (decrease amount) of the actual servo pressure exceeds the special threshold value, the control switching over portion 173 executes normal control by instructing the control portion 171 to terminate the shortening control.

On the other hand, the control switching over portion 173 sets the normal threshold value as a threshold value for terminating the shortening control when the judgement result of the state judging portion 172 is the state of pressure decreasing performance characteristics during the pressure decreasing control of the actual servo pressure. The control switching over portion 173 executes normal control by instructing the control portion 171 to terminate the shortening control when the change amount (decrease amount) of the actual servo pressure exceeds the normal threshold value.

Figure 2:
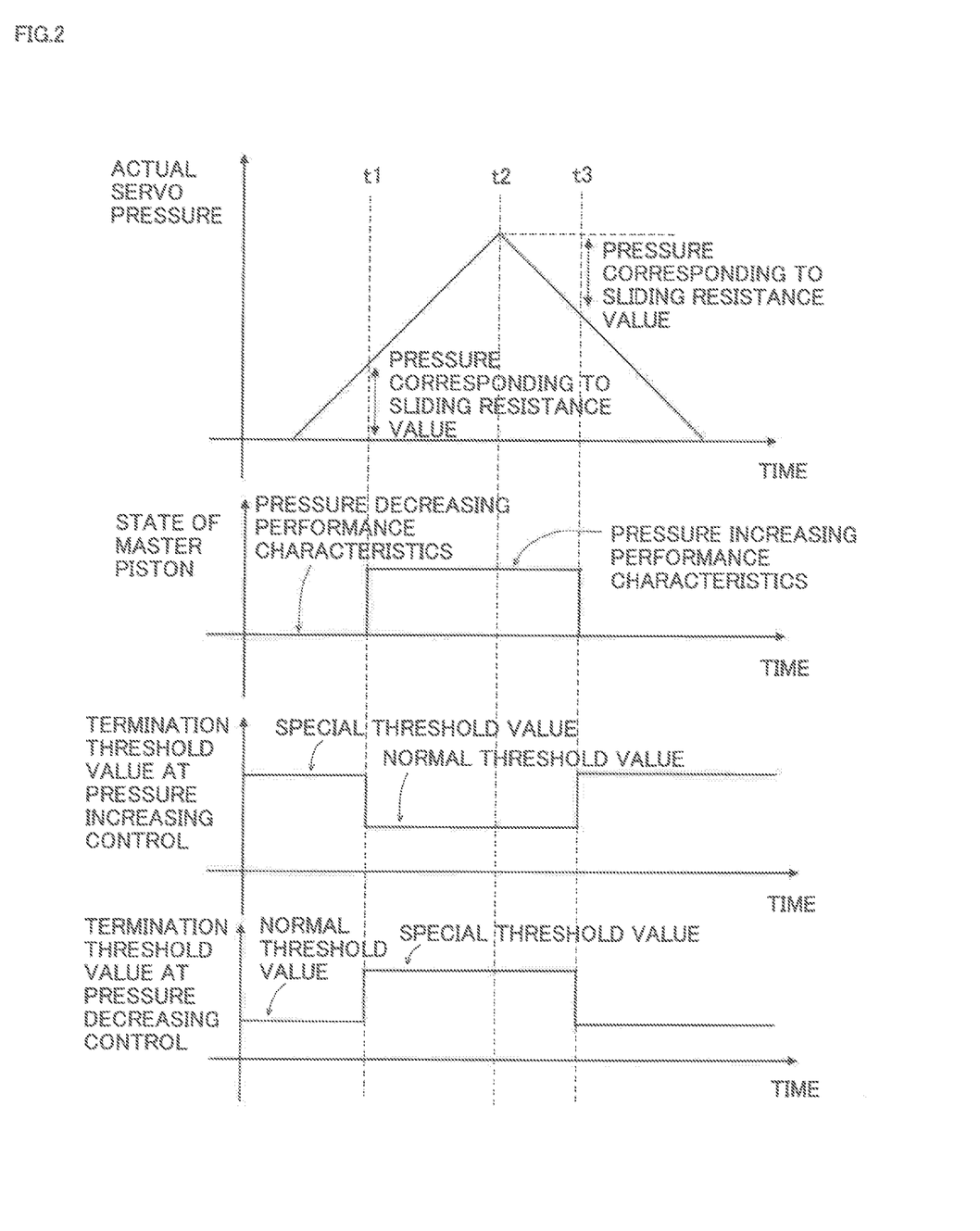
FIG. 2 is a time chart indicating one example of the control according to the embodiment.

One example of control according to the embodiment will be explained hereinafter with reference to FIG. 2. In this example, the values of the special threshold value, the first inversion threshold value and the second inversion threshold value are set to mutually the same value. Further, as shown in FIG. 2, the change of actual servo pressure is schematically illustrated and as shown in FIG. 2, when the brake operation is not started or when the brake operation is started, the state judging portion 172 judges that the state of the master piston 12*c*, 12*d* is the pressure decreasing performance characteristics state, since the master piston 12*c*, 12*d* has been retreated by the previous brake operation (or during the manufacturing process), or the previous judgement is maintained. At the same time, the control switching over portion 173 sets the special threshold value as a threshold value for terminating the shortening control and when the brake operation is performed and the shortening control is executed, in the closing range the spool 15*a*2 slides in the direction where the volume of the pressure chamber R14 is compressed and the actual servo pressure increases. Under the situation that the sliding resistance is relatively large like the situation explained above, the increase amount of the actual servo pressure tends to become large. However, according to the embodiment, since the shortening control termination threshold value is set to the special threshold value, early termination of the shortening control (without sufficient sliding movement) earlier than expected can be suppressed. Thus, an appropriate shortening control can be executable depending on the situation.

At the time t1, when the increase amount of the actual servo pressure exceeds the special threshold value and the first inversion threshold value, the shortening control terminates and at the same time the judgement by the state judging portion 172 results in the pressure increasing performance characteristics and the shortening control termination threshold value becomes the normal threshold value. At the time t2, upon starting of the pressure decreasing control under the pressure increasing performance characteristics, the shortening control termination threshold value becomes the special threshold value to thereby start comparison between the maximum value and the minimum value regarding the actual servo pressure. Then, at the time t3, the decrease amount of the actual servo pressure exceeds the special threshold value and the second inversion threshold value and the judgement result of the state judging portion 172 indicates the pressure decreasing performance characteristics. Thus, the shortening control termination threshold value becomes the normal threshold value. It is noted here that if the control is switched over to the holding control between the time t1 and the time t2 and thereafter the control is switched over to the pressure increasing control again, since the pressure increasing control starts under the pressure increasing performance characteristics, the shortening control termination threshold value becomes the normal threshold value as shown in FIG. 2.

Thus, according to the embodiment, the state of the master piston 12*c*, 12*d* relating to the hysteresis of the sliding resistance is judged (judgement of magnitude of sliding resistance) to add the state of the master piston 12*c*, 12*d* relating to the tendency (easiness) of change of the servo pressure as an element of the termination judgement. Thus, the accuracy of termination judgement of the shortening control can be improved.

In summary, the vehicle braking device 1 according to the embodiment includes the master cylinder 12, the pressure sensor 26*a*, the regulator 15*a*, the accumulator 15*b*2, the reservoir 15*b*1, the pilot pressure control portion 8, the state judging portion 172 and the control switching over portion 173. The master cylinder 12 includes the master cylinder body 12*a*, the master piston 12*c*, 12*d* which slides within the master cylinder body 12*a* and the servo chamber R5 in which the servo pressure is generated which makes the master piston 12*c*, 12*d* slide. The regulator 15*a* includes the cylinder body 15*a*1 which is formed with the high pressure port PT13 and the low pressure port PT14, the spool 15*a*2 which is slidable within the cylinder body 15*a*1 within the sliding range including the closing range and the opening range, the pilot chamber R11 in which the pilot pressure is generated which makes the spool 15a2 slide and the pressure chamber R14 connected to the servo chamber R5 and which volume changes in response to the slidable movement of the spool 15a2. The accumulator 15b2 is configured to supply the pressure chamber R14 via the high pressure port PT13 with the operating liquid which is equal to or more than a predetermined pressure under the state that the high port PT13 is open. The reservoir 15b2 is a member which is connected to the pressure chamber R14 via the low pressure port PT14 under the state that the low port PT14 is open to maintain the pressure at a low level lower than the predetermined pressure.

Further, assuming that the liquid pressure outputted towards a wheel cylinder WC from the master cylinder 12 is a master pressure, the state judging portion 172 judges that the state that the master piston 12c, 12d slidably moves in a direction where the master pressure increases and stops is the state of pressure increasing performance characteristics and the control switching over portion 173 memorizes in advance a normal threshold value and a special threshold value which are values relative to a change amount of the servo pressure and which are threshold values which terminate the shortening control. While the state of the master piston 12c, 12d is judged to be the state of pressure increasing performance characteristics by the state judging portion 172, the control switching over portion 173 sets the special threshold value as the threshold value when a control to the master pressure becomes a pressure decreasing control which decreases the master pressure and sets the normal threshold value as the threshold value when the control to the master pressure becomes a pressure increasing control which increases the master pressure, wherein the special threshold value is a liquid change amount larger than the normal threshold value. Further, the state judging portion 172 judges that the state that the master piston 12c, 12d slidably moves in a direction where the master pressure decreases and stops is the state of pressure decreasing performance characteristics and the control switching over portion 173 while the state of the master piston 12c, 12d is judged to be the state of pressure decreasing performance characteristics by the state judging portion 172, sets the special threshold value as the threshold value when the control to the master pressure becomes a pressure increasing control and sets the normal threshold value as the threshold value when the control to the master pressure becomes a pressure decreasing control.

(Others)

The invention is not limited to the embodiment explained above. Obviously, numerous modifications and variations of the present invention are possible in light of the above teachings. It is therefore to be understood that within the scope of the appended claims, the present invention may be practiced otherwise than as specifically described herein for example, the special threshold value in the case of execution of the pressure increasing control under the pressure decreasing performance characteristics and the special threshold value in the case of execution of the pressure decreasing control under the pressure increasing performance characteristics may be set to different values depending on the shape and or property of the sealing member used in the master cylinder 12. Further, the sliding resistance of the master piston 12c, 12d is generated mainly by an annular seal member (not shown, for example, a cup-shaped seal member having a C-shape in cross section) arranged at front or rear side of the port PT14 and at front or rear side of the port PT16.

BRIEF EXPLANATION OF SYMBOLS & NUMERALS

1: vehicle braking device, 11; brake pedal, 12: master cylinder, 12a: master cylinder body, 12c: first master piston, 12d: second master piston, 15; booster mechanism, 15a; regulator (hydraulic pressure generating portion), 15a1: cylinder body, 15a2: spool, 15b1; reservoir, 15b2; accumulator, 16; actuator, 17; brake ECU, 171; control portion, 172: state judging portion, 173: control switching over portion, 26a: pressure sensor (servo pressure detecting portion). 8: pilot pressure control portion. PT13; high pressure port, PT14; low pressure port, R1: first master chamber, R2: second master chamber, R5: servo chamber R11, pilot chamber R14: pressure chamber, W; vehicle wheel, WC: wheel cylinder.

The invention claimed is:

1. A vehicle braking device comprising:
   a master cylinder which includes a master cylinder body, a master piston slidably movable within the master cylinder body and a servo chamber in which a servo pressure is received which slidably moves the master piston;
   a servo pressure detecting portion which detects the servo pressure;
   a hydraulic pressure generating portion which includes a cylinder body formed with a high pressure port and a low pressure port, a spool slidably movable in the cylinder body within a sliding range which includes a closing range within which the spool closes both the high pressure port and the low pressure port and an opening range within which the spool closes one of the high pressure port and the low pressure port and at the same time opens the other of the high pressure port and the low pressure port, a pilot chamber in which a pilot pressure is received which slidably moves the spool and a pressure chamber which is connected to the servo chamber and which volume is variable by a slidable movement of the spool;
   a high pressure source which supplies the pressure chamber with an operating liquid equal to or more than a predetermined pressure via the high pressure port under the high pressure port being opened;
   a low pressure source which maintains a pressure therein lower than the predetermined pressure and which is connected to the pressure chamber via the low pressure port under the low pressure port being opened;
   a pilot pressure control portion which executes a normal control which controls the pilot pressure in response to a target value of the servo pressure and a shortening control which controls a change amount of the pilot pressure per unit time which slidably moves the spool within the closing range to be larger than the change amount of the pilot pressure per unit time under an execution of the normal control, the normal control and the shortening control being performed at mutually different timings;
   a state judging portion which judges a state of the master piston relating to a hysteresis thereof with respect to a sliding resistance based on a detection result of the servo pressure detecting portion or a liquid pressure correlative to the servo pressure; and
   a control switching over portion which terminates the shortening control based on the detection result of the servo pressure detecting portion and a judging result of the state judging portion.

2. The vehicle braking device according to claim 1, wherein:
the state judging portion judges that the state that the master piston slidably moves in a direction where the master pressure, which is the liquid pressure outputted towards a wheel cylinder from the master cylinder, increases and stops, is a state of pressure increasing performance characteristics; and
the control switching over portion memorizes in advance a normal threshold value and a special threshold value which are values relative to a change amount of the servo pressure and which are threshold values which terminate the shortening control; wherein
while the state of the master piston is judged to be the state of pressure increasing performance characteristics by the state judging portion, the control switching over portion sets the special threshold value as the threshold value when a control to the master pressure becomes a pressure decreasing control which decreases the master pressure and sets the normal threshold value as the threshold value when the control to the master pressure becomes a pressure increasing control which increases the master pressure, and wherein
the special threshold value is a liquid change amount larger than the normal threshold value.

3. The vehicle braking device according to claim 1, wherein:
the state judging portion judges that the state that the master piston slidably moves in a direction where the master pressure, which is the liquid pressure outputted towards a wheel cylinder from the master cylinder, decreases and stops, is a state of pressure decreasing performance characteristics; and
the control switching over portion memorizes in advance a normal threshold value and a special threshold value which are values relative to a change amount of the servo pressure and which are threshold values which terminate the shortening control, wherein
while the state of the master piston is judged to be the state of pressure decreasing performance characteristics by the state judging portion, the control switching over portion sets the special threshold value as the threshold value when a control to the master pressure becomes a pressure increasing control which increases the master pressure and sets the normal threshold value as the threshold value when the control to the master pressure becomes a pressure decreasing control which decreases the master pressure, and wherein
the special threshold value is a liquid change amount larger than the normal threshold value.

* * * * *